United States Patent
Kinast et al.

(10) Patent No.: US 9,323,504 B1
(45) Date of Patent: Apr. 26, 2016

(54) TEMPLATE-DRIVEN DATA ACCESS

(71) Applicant: Amazon Technologies, Inc., Reno, NV (US)

(72) Inventors: Seth Bradon Kinast, Seattle, WA (US); Cameron Dailey Austgen, Seattle, WA (US); Shashank Shekhar, Seattle, WA (US); Teresa Shuk Kwan Lau, Bellevue, WA (US); Jay Austin Crosley, Redmond, WA (US); Oleg Oleg Pistolet, Seattle, WA (US); Gurinder Raju, Seattle, WA (US); Satish Kumar Eerpini, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 35 days.

(21) Appl. No.: 14/219,978

(22) Filed: Mar. 19, 2014

(51) Int. Cl.
*G06F 9/44* (2006.01)

(52) U.S. Cl.
CPC .................................. *G06F 8/35* (2013.01)

(58) Field of Classification Search
USPC ......................................................... 717/104
See application file for complete search history.

(56) References Cited

U.S. PATENT DOCUMENTS

| | | | | |
|---|---|---|---|---|
| 9,063,672 | B2 * | 6/2015 | Madl et al. | 1/1 |
| 2006/0064667 | A1 * | 3/2006 | Freitas | 717/104 |
| 2006/0206861 | A1 * | 9/2006 | Shenfield et al. | 717/106 |
| 2006/0236254 | A1 * | 10/2006 | Mateescu et al. | 715/762 |
| 2008/0082959 | A1 * | 4/2008 | Fowler | 717/104 |
| 2009/0138436 | A1 * | 5/2009 | Halberstadt et al. | 707/3 |
| 2011/0093480 | A1 * | 4/2011 | Heidloff et al. | 707/756 |
| 2011/0187719 | A1 * | 8/2011 | Usui et al. | 345/441 |
| 2013/0019224 | A1 * | 1/2013 | Madl et al. | 717/104 |
| 2013/0024770 | A1 * | 1/2013 | Kang et al. | 715/273 |
| 2013/0238384 | A1 * | 9/2013 | Caesar et al. | 705/7.27 |
| 2013/0326470 | A1 * | 12/2013 | Jentsch et al. | 717/104 |
| 2013/0332897 | A1 * | 12/2013 | Dim et al. | 717/104 |
| 2014/0059517 | A1 * | 2/2014 | Premkumar et al. | 717/105 |
| 2014/0137077 | A1 * | 5/2014 | Winkler et al. | 717/105 |
| 2014/0289698 | A1 * | 9/2014 | Tanguy et al. | 717/104 |

* cited by examiner

*Primary Examiner* — Marina Lee
(74) *Attorney, Agent, or Firm* — Kilpatrick Townsend & Stockton LLP

(57) ABSTRACT

Template-driven data access is enabled. A collection of data model component identifiers that are accessible for use by view developers may be established. View developers may specify views of the data model with a view description language and may utilize accessible data model component identifiers to reference data model components that may be rendered in the views. The views may be in accordance with a Model-View-Controller (MVC) architecture. In contrast to a conventional MVC architecture, changes to a view do not require changes to a corresponding controller. For example, view developers may create, update, modify and delete views independent of the activity of controller developers. In accordance with at least one embodiment, there is a universal controller for views specified with the view specification language and/or utilizing the predefined collection of accessible data model component identifiers.

24 Claims, 7 Drawing Sheets

TEMPLATE-DRIVEN DATA ACCESS

BACKGROUND

Networked computer systems have become a part of everyday life, facilitating and participating in all manner of activities. In concert, there has arisen an industry and disciplines dedicated to the configuration of such computer systems including computing professionals sometimes call computer programmers or computer application developers (collectively, "developers"). Developers have designed a variety of schemes for configuring modern computer systems in ways that are correct, reliable, scalable to accommodate large numbers of users and flexible enough to adapt to changing demands. One popular scheme separates programmatic functionality according to a Model-View-Controller (MVC) architecture. However, some conventional Model-View-Controller architectures have shortcomings.

For example, separation of programmatic functionality can correlate with and/or cause separation of developer responsibility. In a given project, some developers may be assigned responsibility for the data model ("model developers"), some developers may be assigned responsibility for the views of the data model ("view developers") and some for the controller ("controller developers"). Such separation may be more or less strict, and may achieve efficiencies, nevertheless at times changes to the functionality of a computing application impact multiple sides of the separation, and for some projects it is often the case that both view developers and controller developers are impacted. This can lead to situations in which view developers are waiting on action by controller developers, and vice versa, lessening and even negating advantages of the separation.

In addition, different aspects of the Model-View-Controller separation can have different trust and/or security requirements. For example, the architecture and programmatic functional related to the data model may have high security and reliability requirements and there may even be legal repercussions for flaws. In contrast, view and/or user interface aspects of the architecture may have lower security requirements and may even be open to end-user and $3^{rd}$ party customization and modification. The security situation can lead to non-ideal separations between view, model and controller responsibilities, again detracting from the advantages of the scheme. This situation can be aggravated in a multi-tenant context, where several unrelated tenants share system infrastructure. For example, portions of the data model may be private to particular tenants, and other portions may be private to the infrastructure. In this context, the separation between view aspects of the architecture and other aspects can be sharp.

BRIEF DESCRIPTION OF THE DRAWINGS

Various embodiments in accordance with the present disclosure will be described with reference to the drawings, in which.

DETAILED DESCRIPTION

Figure 1:
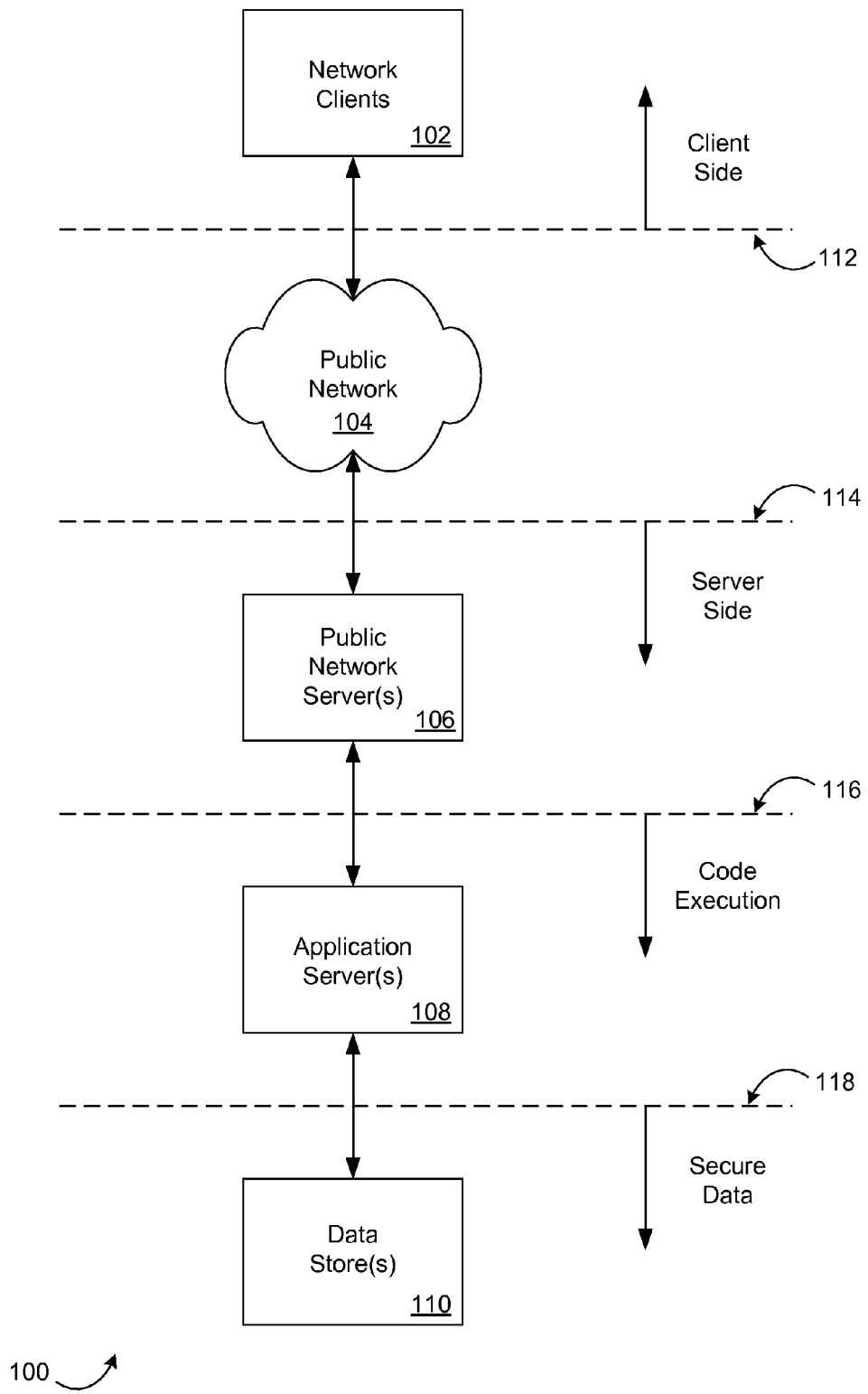
FIG. 1 is a schematic diagram depicting aspects of an example system architecture in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In accordance with at least one embodiment, template-driven data access is enabled. A data model may structure and/or arrange multiple components including data objects, data structures, data fields and data elements. Individual data model components may be associated with unique identifiers that can be used to reference the components. A collection of data model component identifiers that are accessible for use by view developers ("accessible data model component identifiers") may be established (e.g., predefined and/or defined in advance of use by view developers). The data model may also include data model components that are not accessible for use by view developers ("inaccessible data model components"). View developers may specify views of the data model with a view description language and may utilize accessible data model component identifiers to reference data model components that may be rendered (e.g., have values inserted and/or given a visual representation) in the views. For example, the view specification may include view templates that define a visual appearance of a view and use accessible data model component identifiers to indicate regions of the view render in which a visual representation of the referenced data model components should appear. These views may be in accordance with a Model-View-Controller (MVC) architecture. In accordance with at least one embodiment, and in contrast to a conventional MVC architecture, changes to a view do not require changes to a corresponding controller. For example, view developers may create, update, modify and delete views independent of the activity of controller developers. In accordance with at least one embodiment, there is a universal controller for views specified with the view specification language and/or utilizing the predefined collection of accessible data model component identifiers that efficiently provides data model components for view rendering.

For example, Valarie is a view developer and Craig is a controller developer working on a computing application with an MVC architecture. Conventionally, when creating or modifying a view, Valarie would often be required to work with Craig to create or modify a corresponding controller. In attempting to be responsive to end-user demands, Valarie's requests may come into conflict with Craig's responsibility to infrastructure (sometimes called "back end") priorities. In accordance with at least one embodiment, Valerie is free to work independently of Craig at least in part by specifying the views with the view specification language and/or utilizing the predefined collection of accessible data model component identifiers (e.g., "AcmeInc.catalog.itemList" and "item.price"). Such view specifications may be automatically parsed and processed by a computing application "framework" in accordance with at least one embodiment.

In accordance with at least one embodiment, a view specification may be parsed by a view generator to detect data model component identifiers of the predefined collection of accessible data model component identifiers. The view generator may request corresponding data model components and store them in a rendering data pool while rendering the view. A universal controller may maintain a map of accessible data model component identifiers to data model component locations and may respond to the requests of the view generator using the map. The view generator may be generating the view in response to a request for the view by an end-user. The request for the view may occur within a context such as a user interface interaction session. The universal controller may take into account session attributes (e.g., the tenant owner of the view in a multi-tenant environment) when responding to view generator requests. The view generator may render the view with the data model components stored in the rendering data pool. Significantly, while the universal controller may efficiently provide data model components for view rendering (e.g., provide a minimum number of required data model components), modifications to the view specification need not involve changes to the universal controller. In accordance with at least one embodiment, the view specification configures the universal controller to provide the data model components required by the view generator to render the corresponding view.

Turning now to the figures, FIG. 1 depicts aspects of an example system architecture 100 in accordance with at least one embodiment. Network clients 102 may interact with one or more public network servers 106 over a public network 104. For example, network clients 102 may include personal computers, laptop computers, tablet computing devices, smart phones and any suitable computing device and/or a computing application or "app" executing on the computing device. The public network 104 may include any suitable wired and/or wireless networking components including networking components configured to transmit analog and/or digital data. For example, the public network 104 may include the Internet. Although in this example, for clarity, the network 104 is publically accessible, the network 104 may be semi-public, protected and/or private, and similar for the network server(s) 106. In accordance with at least one embodiment, a computing application may have a client-side 112, implemented at least in part by the network clients 102, and a server-side 114, implemented at least in part by a multi-tier server-side architecture including the public network server(s) 106, one or more application servers 108 and one or more data stores 110. Although, for clarity, only three server-side tiers 106, 108, 110 are shown in FIG. 1, architectures in accordance with at least one embodiment may include any suitable number of tiers.

The tiers 106, 108, 110 of the server-side architecture may be associated with different security levels, concerns and/or policies. For example, the public network server(s) 106, being in a security zone with a relatively low level exposed to direct interaction with the untrusted public network 104, may maintain relatively simple server applications such as hypertext transport protocol (e.g., HTTP) servers, intended to be resistant to malicious interaction. The application server(s) 108 may reside in a security zone 116 with a higher level that allows application code execution and may assume a defined set of interactions with respect to the public network 104. The data store(s) 110 may reside in a security zone 118 with a still higher level that enforces strict access policies intended to secure the data in the data store(s) 110 against unauthorized access and is suspicious of application code execution. Security policies may be enforced by the servers 106, 108, 110 when appropriate and/or by network level security components not shown in FIG. 1. Computing application implemented with conventional MVC architecture components may flaw such security zones 116, 118, particularly in multi-tenant environments where the server-side 114 includes infrastructure operated by a service provider and shared by multiple tenants. In particular, allowing arbitrary code execution by tenant controllers on application server(s) 108 having access to data models in the data store(s) 110 can be problematic.

Figure 2:
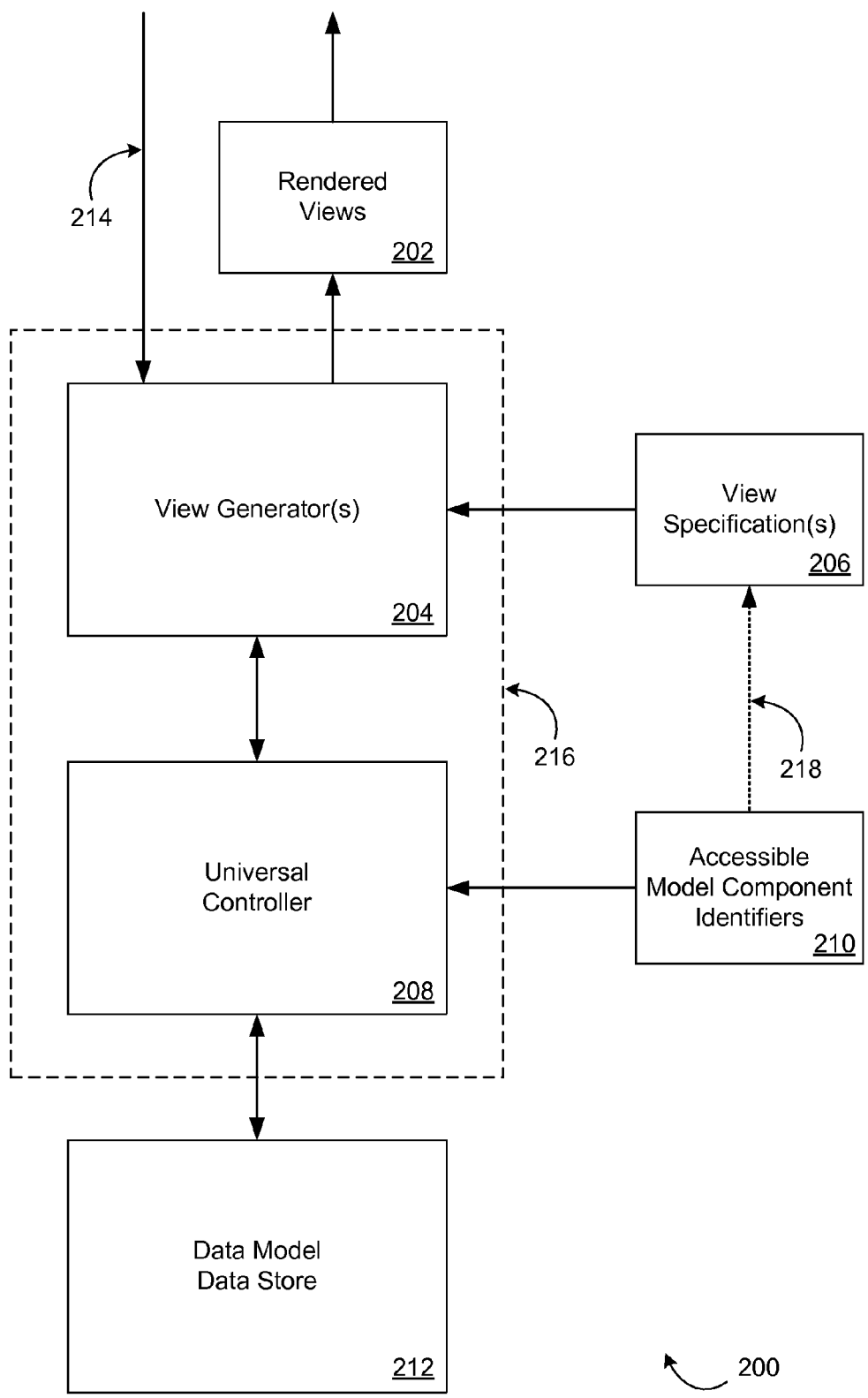
FIG. 2 is a schematic diagram depicting further aspects of an example system architecture in accordance with at least one embodiment.

FIG. 2 depicts further aspects of an example architecture 200 in accordance with at least one embodiment. The architecture 200 is in accordance with a Model-View-Controller architectural scheme and may be implemented with one or more components of a server-side architecture such as the multi-tiered service-side architecture 114 of FIG. 1. For example, one or more data stores 110 may be utilized to implement a data store 212 storing a data model. The data store 212 and/or the data model may also incorporate components from network servers not shown in FIG. 1, for example, other network servers, web sites and/or web services accessible through the public network 104. A collection of accessible data model component identifiers 210 may be established and maintained and utilized 218 by view developers to create, update and modify one or more view specifications 206. The collection 210 may be predefined with respect to utilization by view developers. In response to end-user requests 214, one or more view generators 204 may parse one or more corresponding view specification (s) 206 to detect accessible data model component identifiers. In accordance with at least one embodiment, the views corresponding to the view specification(s) 206 require data model component data and/or values corresponding to the set of detected data model component identifiers to fully render and are said to depend upon the corresponding set of data model components. The view generator(s) 204 may request data model components corresponding to the detected accessible data model component identifiers from a universal controller 208. The controller 208 may be universal with respect to views in the sense that one controller 208 may act in the controller role for any suitable view specified with view specifications 206. The controller 208 may efficiently (e.g., optimally and/or with minimal data transfer) provide data model components required to render a view. Unless otherwise specified, or clearly contradicted by context, the phrase "a data model component" can mean "a copy of a data model component", and vice versa, throughout this specification.

The universal controller 208 may maintain a map of accessible model component identifiers 210 to storage locations of data model components, for example, to storage locations in the data model data store 212. The universal controller 208 may enforce security and/or data access policies with respect to the requests for data model components from the view generator(s) 204. The universal controller 208 may provide data model components corresponding to the accessible data model component identifiers 210 to the view generator(s) 204. The view generator(s) 204 may store the provided data model components in rendering data pools and use the provided data model components to generate rendered views 202 and provide the rendered views 202 for presentation to the end-users in response to the end-user requests 214. In accordance with at least one embodiment, the rendered views 202 have a visual appearance and/or are suitable for incorporation in a graphical user interface (GUI). Alternatively, or in addition, the rendered views 202 may be data structures and/or formatted data providing a view of the data model data store 212 in the sense of a relational database view, and the end-user that consumes the provided view may be a computer system and/or computer program. Although FIG. 2 depicts the view generator(s) 204 and the universal controller 208 as distinct, in accordance with at least one embodiment, the functionality of the view generator(s) 204 and the universal controller 208 may be integrated into a single view server and/or view server component 216.

View developers may specify views (e.g., create, update or modify view specifications 206) utilizing a view description language in accordance with at least one embodiment. For example, the view description language may include one or more document markup language such as a standard generalized markup language (e.g., SGML), an extensible markup language (e.g., XML) and/or a hypertext markup language (e.g., XML). The view description language may include one or more stylesheet languages such as an extensible stylesheet language (e.g., XSL) and/or a cascading stylesheet language (e.g., CSS). The view description language may include one or more client-side scripting languages such as a scripting language in accordance with an ECMAScript language standard (e.g., in accordance with ISO/IEC 16262). In accordance with at least one embodiment, the view description language may include one or more templating features. In particular, accessible data model component identifiers may be indicated as such and may be replaced with corresponding data model component values when the specified view is rendered to generate rendered views 202. Additional templating features may include definition and tracking of variables and constants of various types, conditional statements that are evaluated at render time, include statements to import other view specifications or portions thereof, looping statements and exception handling statements. Templating features may be indicated in view specifications with any suitable indication detectable by a parser including one or more special purpose delimiters such as pairs of delimiting characters.

Figure 3:
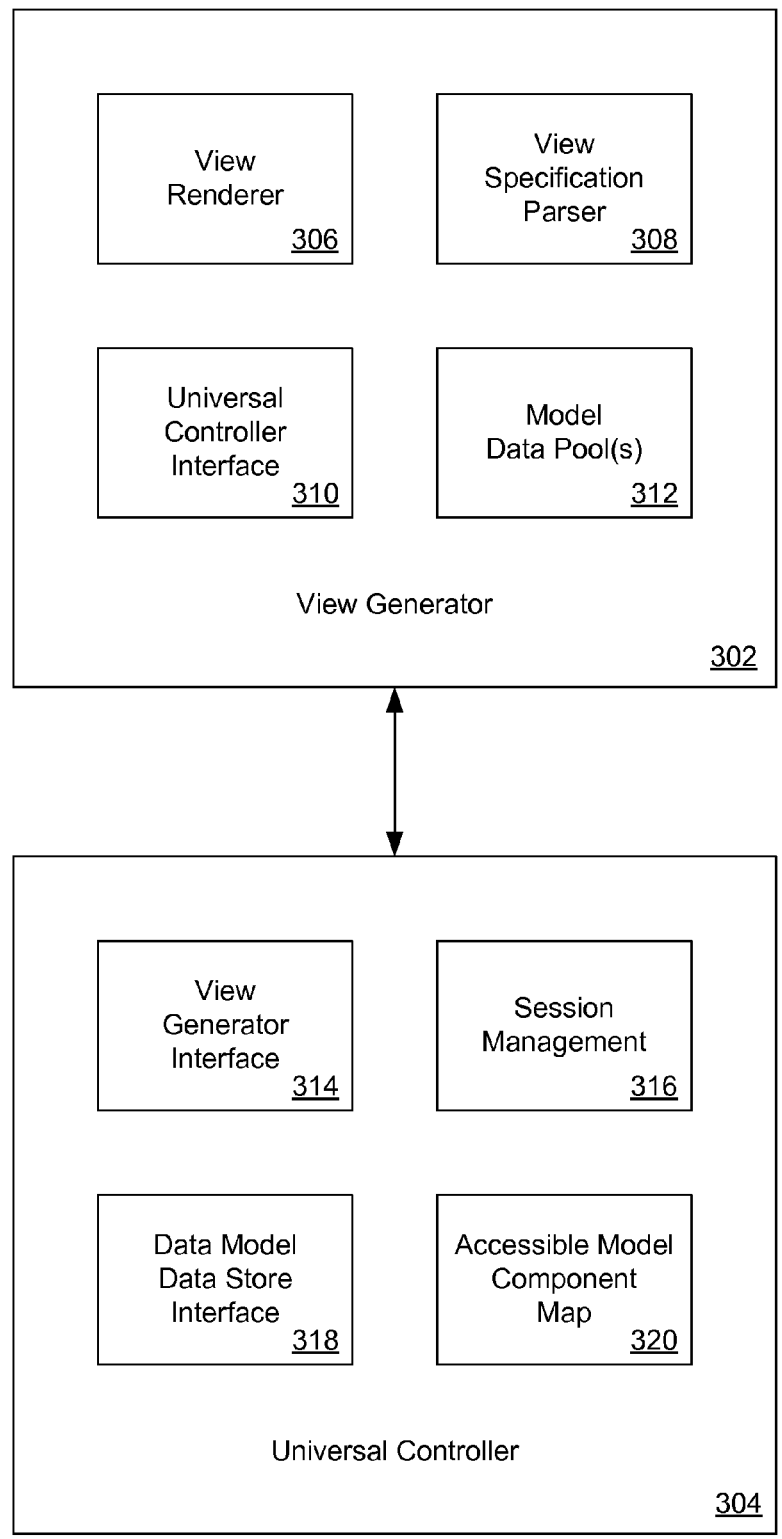
FIG. 3 is a schematic diagram depicting still further aspects of an example system architecture in accordance with at least one embodiment.

FIG. 3 depicts still further aspects of an example architecture 300 in accordance with at least one embodiment. The example architecture 300 includes a view generator 302 and a universal controller 304. The view generator 302 is an example of the view generator(s) 204 of FIG. 2. The universal controller 034 is an example of the universal controller 208 of FIG. 2.

The view generator 302 may include a view renderer 306 configured at least to render views in response to user requests, for example, in response to a view render request and/or a request for a current view of the data model 212 (FIG. 2). A requested view may be associated with a particular view specification. The view renderer 306 may invoke a view specification parser 308 to parse the particular view specification. The view specification parser 308 may parse the particular view specification to detect any suitable templating features including accessible data model component identifiers and conditional statements. The view renderer 306 may request current copies of data model components corresponding to the accessible data model component identifiers detected by the view specification parser 308. For example, the view renderer 306 may request the current copies of the data model components from the universal controller 304 utilizing a universal controller interface 310. At least in part by evaluating conditional statements and requesting data model components at render time, in accordance with at least one embodiment a lazy fetch of data model components is enabled thereby facilitating optimization (e.g., minimization) of associated bandwidth. The universal controller interface 310 may include any suitable user interface such as one or more programmatic interfaces and/or application programming interfaces (APIs) configured at least to provide access to universal controller 304 functionality including inter-module communications.

The universal controller 304 may include a view generator interface 314 configured at least to provide limited access to universal controller 304 functionality by view generators such as the view generator 302 and/or to provide access to view generator 302 functionality. The view generator interface 314 may include any suitable user interface such as one or more programmatic interfaces and/or application programming interfaces (APIs) configured at least to provide access to view generator 302 functionality including inter-module communications.

Requests for views and/or requests for data model components may occur as part of a session that includes multiple such requests. For example, the session may be associated with a particular tenant, a particular end-user and/or a particular session identifier (e.g., a "cookie"-type identifier sent in accordance with a hypertext transfer protocol). The universal controller 304 may include a session management module 316 configured at least to create, update, maintain and delete active sessions, as well as to associate requests for views and/or requests for data model components with particular sessions.

The universal controller 304 may maintain an accessible data model component map 320 configured at least to map accessible data model component identifiers to current data storage locations of corresponding data model components, for example, to current data storage locations of corresponding data model components in the data model data store 212 (FIG. 2). Requests for data model components received from the view generator 302 may include and/or reference accessible data model component identifiers, and the universal controller 304 may fulfill such requests at least in part by obtaining current copies of corresponding data model components from current data model component storage locations as indicated by the accessible data model component map 320. One or more attributes of a session associated with such requests may modify or inhibit the data model component storage locations to which the accessible data model component identifiers are mapped, for example, in accordance with one or more security policies. Same accessible data model component identifiers may map to different data model component storage locations based at least in part on a tenant and/or end-user associated with a session. Authenticated and/or non-authenticated status of tenants and/or end-users may also affect the mapping. At least in part, the accessible data model component map 320 may enable view developers to specify views independent of (e.g., free of) knowledge of data model component storage locations and/or session attributes. For example, a particular data model component identifier "store.catalog" may resolve to different "store" and/or "catalog" objects (e.g., different product catalogs for different online storefronts "Shoes, Inc" and "Flowers 'R' Us, Inc") in the data model data store 212 (FIG. 2).

The universal controller 304 may include a data model data store interface 318 configured at least to provide access to data model data store 212 (FIG. 2) functionality. For example, the data model data store interface 318 may enable the universal controller 304 to create, read, update and/or delete data model components in the data model data store 212, as well as to access and/or change particular data model component storage locations. The data model data store interface 318 may include any suitable user interface such as one or more programmatic interfaces and/or application programming interfaces (APIs) including interfaces utilizing any suitable data store query language such as a structured query language (e.g., SQL).

The universal controller 304 may provide current copies of data model components in response to corresponding requests from the view generator 302. The view generator 302 may store the copies in one or more model data pools 312 such that the copies are available to the view renderer 306. For example, the model data pool(s) 312 may be local, low-latency and/or high-bandwidth with respect to the view renderer 306. Timing of data model component requests and availability of corresponding copies in the model data pool(s) 312 may be optimized with respect to view rendering. For example, data model component requests may be dispatched by the view generator 302 during and/or in response to parsing of a view specification corresponding to a requested view such that current copies of the corresponding data model components are obtained and made available in the model data pool(s) 312 prior to, during and/or in time for rendering of the view by the view renderer 306. In accordance with at least one embodiment, the view renderer 306 may progressively render the view. For example, the view renderer 306 may continuously update a rendering-in-progress of the view as data model components become available in the model data pool(s) 312. In accordance with at least one embodiment, sets of accessible data model component identifiers detected in view specifications during parsing may be cached to enable earlier dispatch of data model component requests to the universal controller 304.

Figure 4:
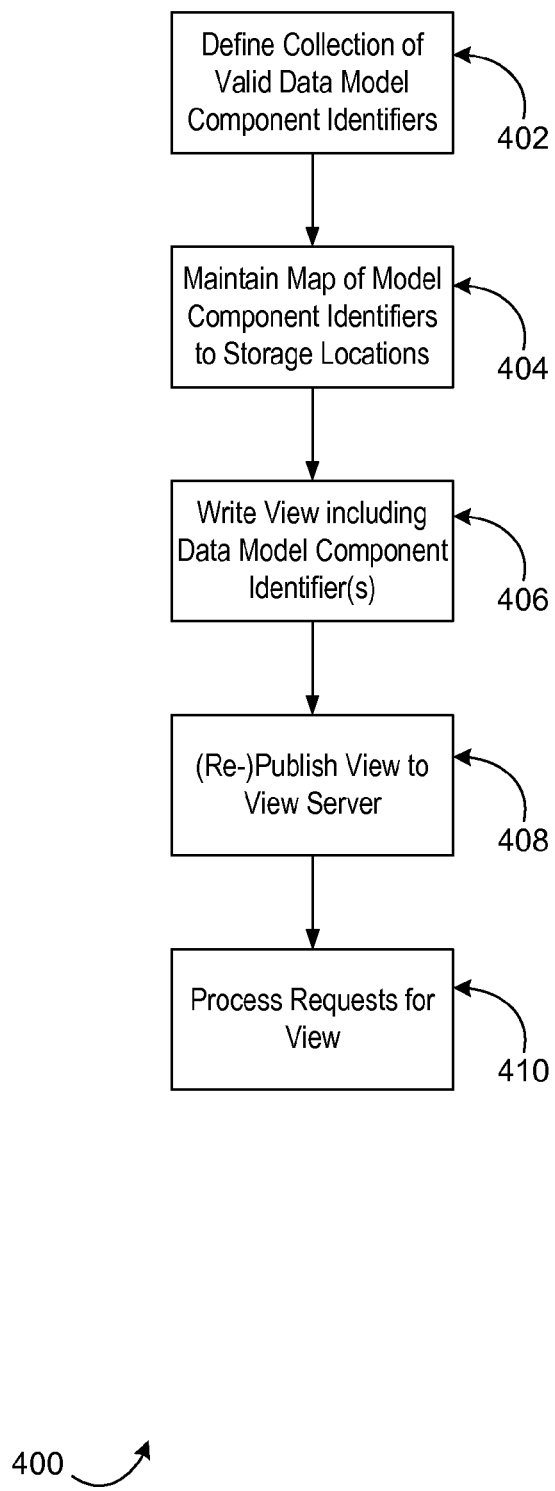
FIG. 4 is a flowchart depicting aspects of an example process for template-driven data access in accordance with at least one embodiment.

Having discussed various architectures, systems and/or system components in accordance with at least one embodiment, the description now turns to procedures, processes and/or methods that may be facilitated by such architectures, systems and/or system components. FIG. 4 depicts of an example process 400 for template-driven data access in accordance with at least one embodiment. Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 402, a collection of valid and/or accessible data model component identifiers may be defined. For example, a subset of components of a data model may be made accessible to view developers, and corresponding data model identifiers may be indicated as valid for utilization by view developers. A copy of a master and/or authoritative accessible data model component identifier collection may be made available to view developers. At 404, a map of accessible data model component identifiers to current storage locations of corresponding data model components may be maintained. The universal controller 304 (FIG. 3) may utilize the data model data store interface 318 to maintain the accessible data model component map 320. For example, the data model data store interface 318 may enable the universal controller 304 to subscribe to notifications with respect to data model component storage locations (e.g., create, update and/or delete notifications).

At 406, a view specification including one or more accessible data model component identifiers may be created and/or updated. For example, a view developer may write the view specification with a suitable view specification language. At 408, the view specification of 406 may be published and/or republished to one or more view servers such as the application server(s) 108 (FIG. 1). For example, the view specifications may correspond to data files, and the data files may be published with any suitable published technique and/or mechanism. At 410, requests for views may be processed, including views corresponding to the view specification of 406. For example, the view generator 204 (FIG. 2) and/or view server 216 may receive and process such requests.

Figure 5:
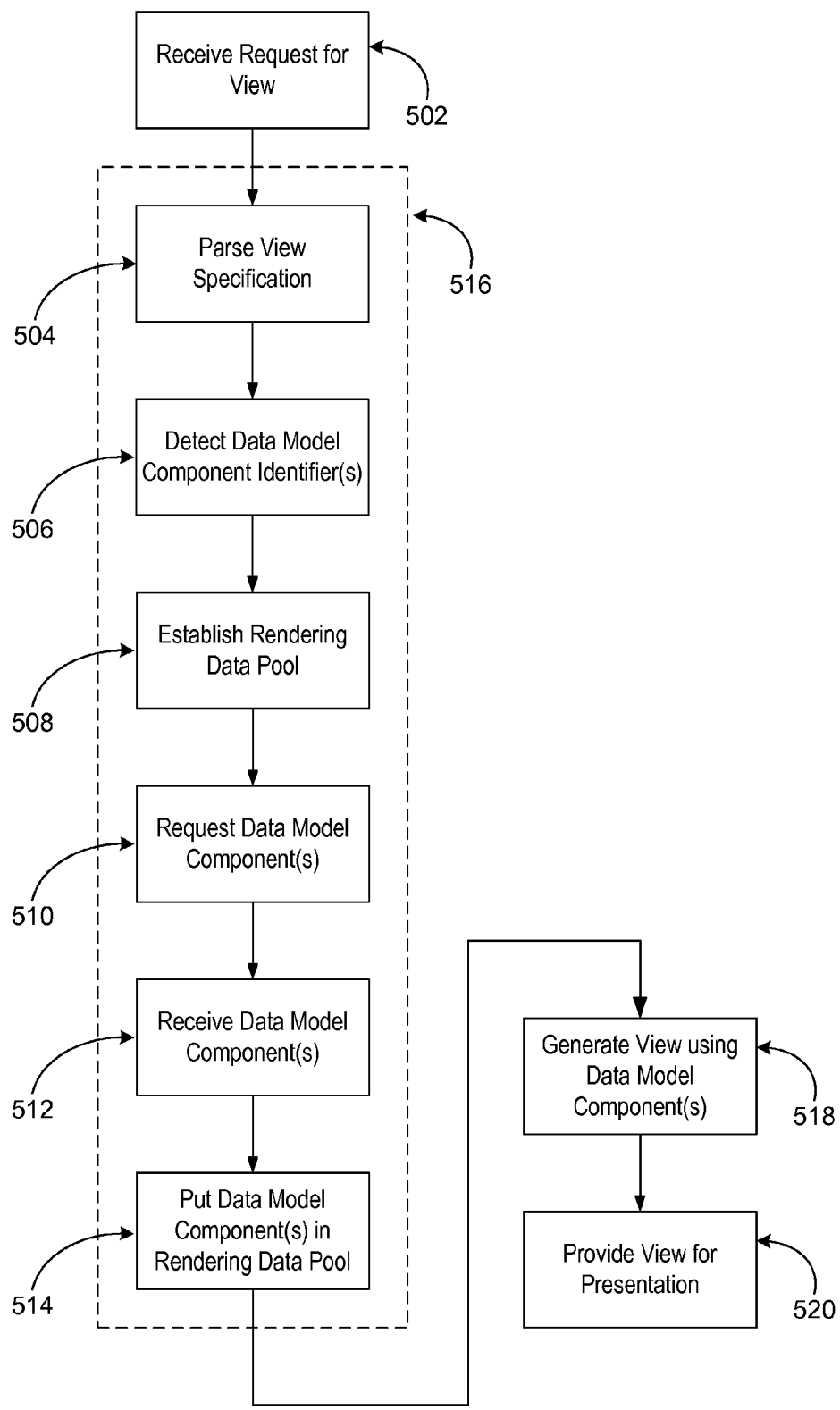
FIG. 5 is a flowchart depicting aspects of an example process for processing requests for data model views in accordance with at least one embodiment.

FIG. 5 depicts aspects of an example process 500 for processing requests for data model views in accordance with at least one embodiment. At 502, a request for a view may be received. For example, the view generator 302 (FIG. 3) may receive the request. The view may be associated with a view specification, for example, the view request of 502 may include a view identifier associated with the view specification. At 504, the view specification may be parsed, for example, by the view specification parser 308. At 506, one or more accessible data model component identifiers may be detected, for example, by the view specification parser 308.

At 508, a rendering data pool may be established. For example, the view generator 302 (FIG. 3) may create and/or update one of the model data pools 312 suitable to receive data model components corresponding to the data model component identifiers detected at 506. The rendering data pool may be established responsive to 502, 504 and/or 506. Alternatively, or in addition, the rendering data pool may be pre-established in anticipation of receiving requests similar to those of 502. At 510, one or more data model component requests may be dispatched. For example, the view generator 302 may dispatch one or more data model component requests corresponding to the data model component identifiers detected at 506. At 512, one or more data model components may be received. For example, the view generator 302 may receive current copies of data model components corresponding to the data model component identifiers detected at 506. At 514, received data model components may be placed in the rendering data pool established at 508. Dashed line 516 indicates that one or more of 504, 506, 508, 510, 512 and 514 may occur in parallel to optimize (e.g., minimize) rendering time.

At 518, a view corresponding to the requested view of 502 may be generated with the received data model components placed in the rendering data pool, for example, by the view renderer 306 (FIG. 3). At 502, the generated view may be provided for presentation, for example, at with a presentation application of the requesting client 102 (FIG. 1).

Figure 6:
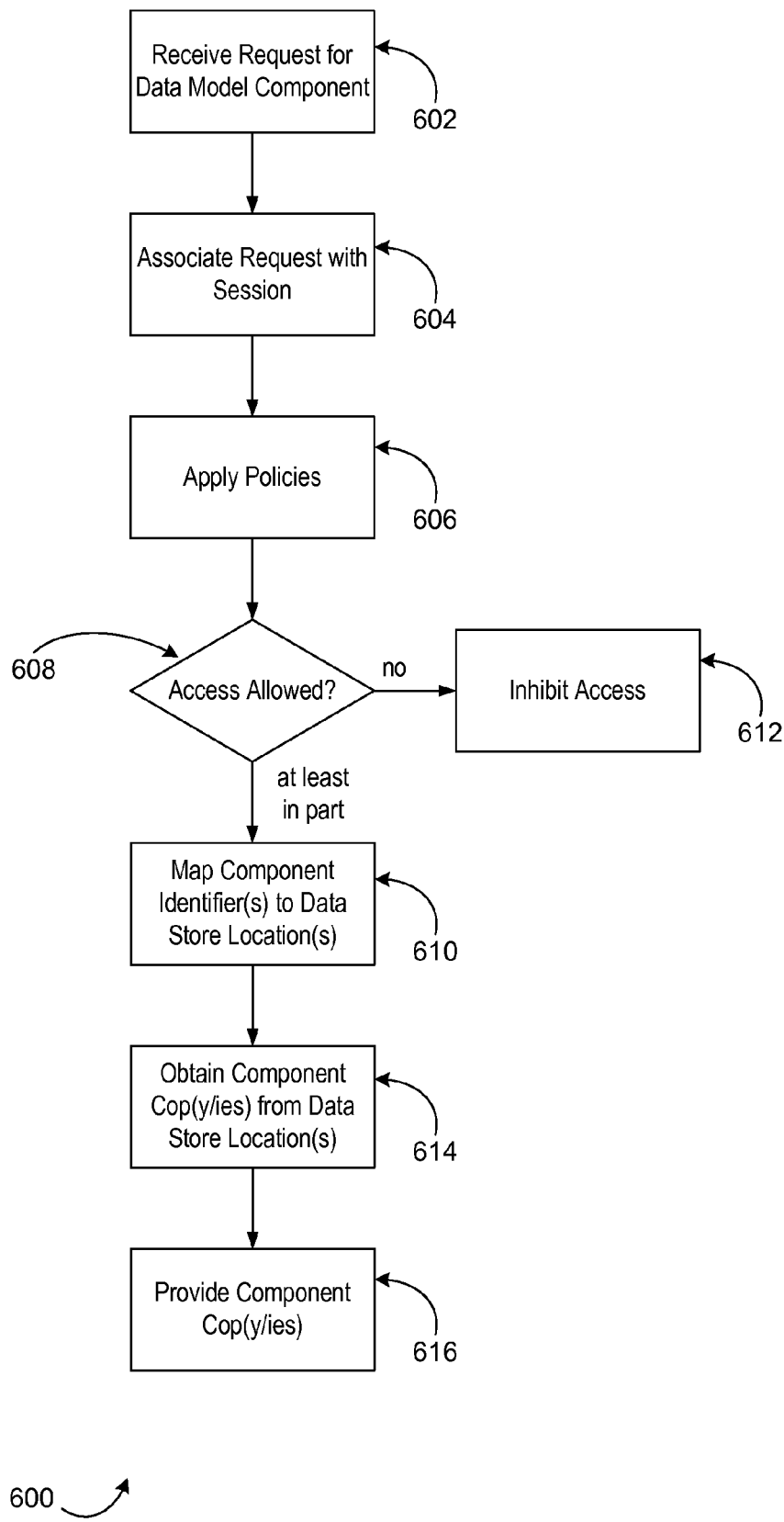
FIG. 6 is a flowchart depicting aspects of an example process for processing requests for data model components in accordance with at least one embodiment.

FIG. 6 depicts aspects of an example process 600 for processing requests for data model components in accordance with at least one embodiment. At 602, a request for a current copy of a data model component may be received, for example, by the universal controller 304 (FIG. 3). At 604, the request may be associated with a session, for example, by the session management module 316. At 606, one or more access policies (e.g., security policies) may be applied, for example, by the universal controller 304. At 608, responsive to the application of the access policies of 606, it may be determined whether access to the requested data model components is allowed. If so, the process 600 may progress to 610. Otherwise, access may be inhibited at 612 and the requestor notified. Access levels need not be limited to the binary choice of all or none. For example, a partial level of access to information associated with requested data model components may be allowed. For example, access may be restricted and/or reduced in accordance with the security policies. Access policies need not be limited to security policies. For example, a throttling policy may be applied at 606, and view requests in excess of a request rate threshold may be inhibited at 612.

At 610, one or more data model component identifiers may be mapped to current data model component storage locations, for example, with the accessible data model component map 320 (FIG. 3). At 614, current copies of data model components corresponding to the data model component identifiers of 610 may be obtained from the data model component storage locations determined at 610, for example, with the data model data store interface 318. At 616, the current copies obtained at 614 may be provided in response to the request of 602, for example, to the view generator 302.

Figure 7:
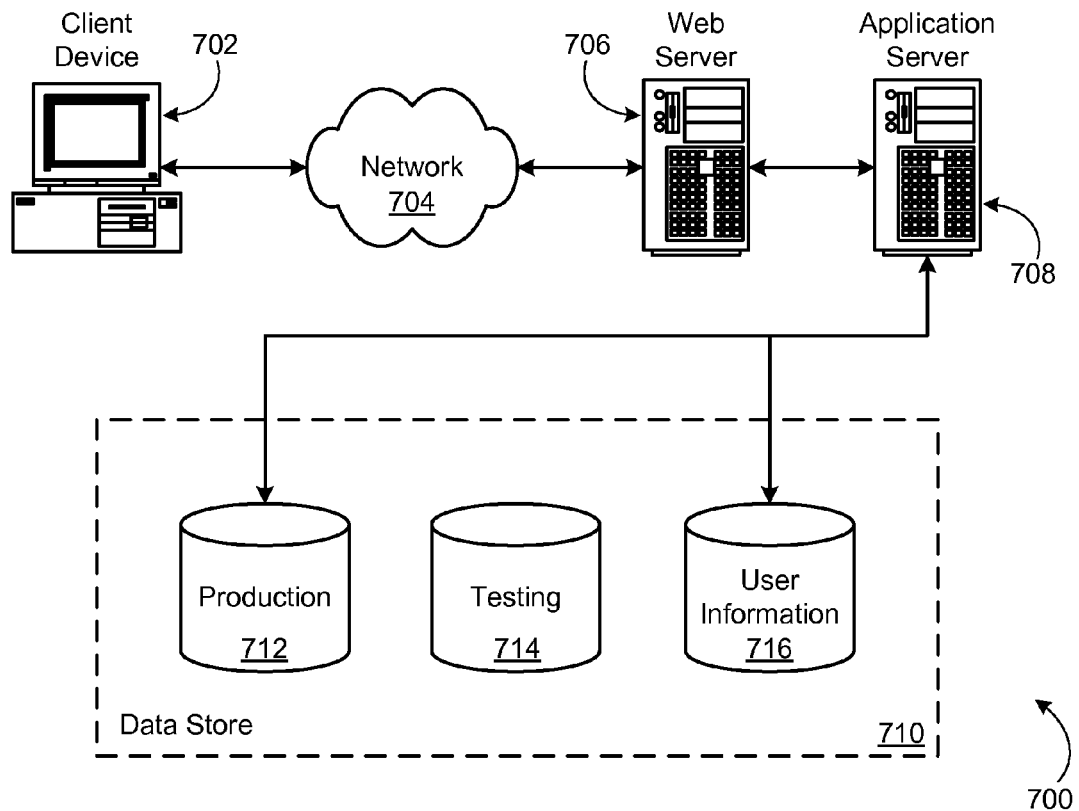
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server.

It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for template-driven data access, comprising:
    maintaining, by a computer system, a predefined collection of valid data model component identifiers;
    receiving a view specification of a data model view including a data model component identifier of the predefined collection of valid data model component identifiers;
    requesting a data model component corresponding to the data model component identifier, wherein the view specification is created by a view developer independent of knowledge of a data model component storage location corresponding to the data model component;
    subsequent to receiving the data model component, generating, by the computer system, the data model view based at least in part on the view specification and the data model component; and
    providing the data model view for presentation to a user.

2. A computer-implemented method in accordance with claim 1, further comprising:
    maintaining a map from the predefined collection of valid data model component identifiers to a dynamic collection of data model component storage locations;
    receiving the request for the data model component corresponding to the data model component identifier;
    determining a particular data model component storage location corresponding to the requested data model component based at least in part on the map and the data model component identifier; and
    providing the data model component from the determined particular data model component storage location.

3. A computer-implemented method in accordance with claim 1, wherein:
    the method further comprises parsing the view specification to detect the data model component identifier of the predefined collection of valid data model component identifiers; and
    the data model component is requested responsive to detection of the data model component identifier in the view specification during the parsing.

4. A computer-implemented method in accordance with claim 1,
    the method further comprises maintaining a data model including a first collection of data model components corresponding to the predefined collection of valid data model component identifiers and a second collection of data model components that do not have corresponding identifiers in the predefined collection of valid data model component identifiers; and
    requests for data model components in the second collection are inhibited.

5. A computer-implemented method in accordance with claim 1, wherein the data model view specified by the view specification is in accordance with a model-view-controller (MVC) computing application architecture.

6. A computer-implemented method for template-driven data access, comprising:
    receiving, by a computer system, a specification of a view of a data model, the specification including a data model component identifier of a predefined collection of data model component identifiers, wherein the specification is created by a view developer independent of knowledge of a data model component storage location corresponding to a data model component;
    generating, by the computer system, the view based at least in part on the specification and the data model component corresponding to the data model component identifier; and
    providing the view for presentation.

7. A computer-implemented method in accordance with claim 6, wherein the specification includes one or more elements of a view description language and the view description language incorporates the predefined collection of data model component identifiers.

8. A computer-implemented method in accordance with claim 7, wherein the view comprises a hypertext document and the view description language comprises a hypertext markup language.

9. A computer-implemented method in accordance with claim 6, wherein generating the view comprises substituting one or more values of the data model component for the data model component identifier.

10. A computer-implemented method in accordance with claim 9, wherein a presentation of the view comprises a plurality of visual presentation regions, the specification of the view associates the data model component identifier with one or more visual presentation regions of the plurality of visual presentation regions and, upon presentation, the one or more values of the data model component are presented in the one or more visual presentation regions associated with the data model component identifier.

11. A computer-implemented method in accordance with claim 6, wherein, upon presentation, the view is incorporated into an interactive user interface.

12. A computer-implemented method in accordance with claim 6, further comprising maintaining a map from the predefined collection of data model component identifiers to a dynamic collection of data model component storage locations, and wherein generating the view includes generating based at least in part on the map.

13. A computer-implemented method for template-driven data access, comprising:
    specifying, at a first computer system, a view of a data model with a view description language including utilizing a data model component identifier of a predefined collection of data model component identifiers to reference a corresponding component of the data model independent of a data storage location of the corresponding component of the data model, wherein the view description language is created by a view developer independent of knowledge of the data storage location; and configuring a second computer system to at least provide the view for presentation to a user at least in part by providing the specification of the view to the second computer system.

14. A computer-implemented method in accordance with claim 13, further comprising reconfiguring the second computer system at least provide an updated view for presentation to the user at least in part by providing an updated specification of the view to the second computer system.

15. A computer-implemented method in accordance with claim 13, wherein:

the view of the data model is in accordance with a model-view-controller (MVC) computing application architecture; and the one or more computers systems are configured to collectively at least provide the view for presentation independent of specifying a corresponding controller of the data model.

16. A computer-implemented method in accordance with claim 15, wherein the second computer system is further configured to provide a plurality of different views for presentation based at least in part on a corresponding plurality of different view specifications written with the view description language and utilizing a universal controller.

17. A computer-implemented method in accordance with claim 13, wherein:

the second computer system comprises a multi-tenant computer system configured at least to provide a plurality of different views associated with a plurality of different tenants of the multi-tenant computer system, individual tenants having different access to data stored in accordance with the data model; and specifying individual views of the data model with the view description language is independent of an associated tenant.

18. One or more non-transitory computer-readable data storage media storing computer-executable instructions that configure one or more computers to, at least:

receive a request for a view of a data model, the view defined at least in part by a view specification written in a view description language and including a set of data model component identifiers selected from a predefined collection of data model component identifiers, wherein the view specification is created by a view developer independent of knowledge of data model component storage locations corresponding data model components;

establish a rendering data pool suited to contain particular data model components corresponding to the set of data model component identifiers;

obtain a copy of the particular data model components and storing the copy in the rendering data pool;

generate the view based at least in part on the view specification and the copy of the particular data model components stored in the rendering data pool; and provide the view for presentation.

19. One or more non-transitory computer-readable data storage media in accordance with claim 18, wherein the request for the view is one of a plurality of requests for views of the data model, the plurality of requests occur with respect to a session of interaction with a user interface and the one or more computers are further configured to determine accessibility of the particular data model components based at least in part on one or more attributes of the session.

20. One or more non-transitory computer-readable data storage media in accordance with claim 18, wherein different rendering data pools are established responsive to different requests for views of the data model.

21. One or more non-transitory computer-readable data storage media in accordance with claim 18, wherein the rendering data pool is established responsive to receiving the request for the view and the copy of the particular data model components is stored in the rendering data pool prior to completing generation of the view.

22. One or more non-transitory computer-readable data storage media in accordance with claim 18, wherein obtaining a copy of the particular data model components comprises sending requests for individual data model components to a controller.

23. One or more non-transitory computer-readable data storage media in accordance with claim 22, wherein the requests corresponding to individual data model components are sent during parsing of the view specification and responsive to detection of data model component identifiers.

24. One or more non-transitory computer-readable data storage media in accordance with claim 22, wherein the requests for individual data model components are sent from a first computing environment to a second computing environment, the second computing environment having a higher level of security with respect to the first computing environment.

* * * * *